June 29, 1965  F. W. HOTTENROTH ETAL  3,191,556
CHARCOAL STARTER
Filed June 24, 1963
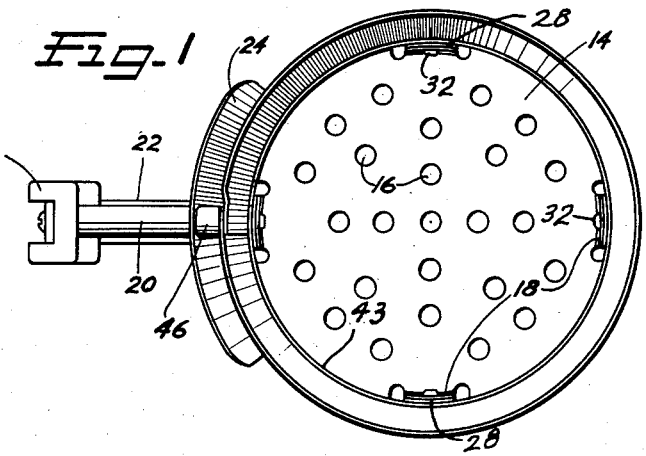
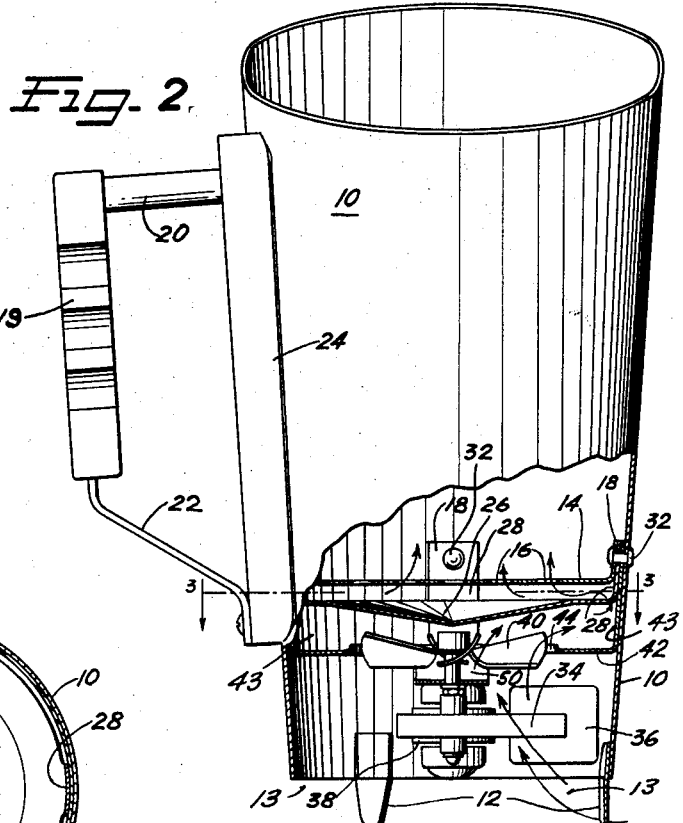
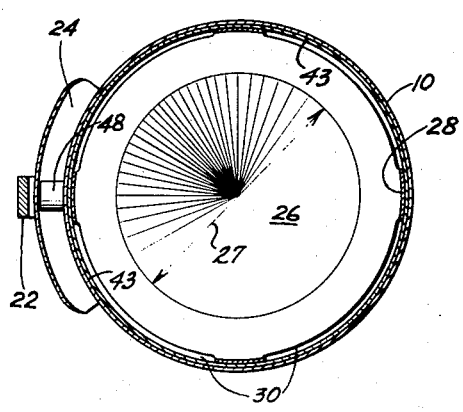
INVENTORS
Frederick W. Hottenroth
BY and Harry D. Jacoby
Bair, Freeman & Molinare
ATTORNEYS

United States Patent Office 3,191,556
Patented June 29, 1965

3,191,556
CHARCOAL STARTER
Frederick W. Hottenroth, Palos Verdes Peninsula, and Harry D. Jacoby, Palos Verdes Estates, Calif., assignors to Z.Z. Corp., Compton, Calif., a corporation of California
Filed June 24, 1963, Ser. No. 290,109
4 Claims. (Cl. 110—1)

This invention relates to a charcoal starter of comparatively simple and inexpensive construction.

One object of the invention is to provide an apparatus including air circulating means for providing forced draft to readily start a quantity of charcoal from a small quantity of burning paper or other tinder as a starter for the charcoal itself.

Another object is to provide charcoal starter which includes a cone-shaped or cylinder-shaped charcoal container in which ignition of the charcoal is readily initiated and after the charcoal is ignited throughout, which takes only about five minutes, the contents of the container can be dumped into a barbecue grill or the like.

Still another object is to provide the container so constructed as to efficiently introduce forced air for ignition of the charcoal from the burning paper or tinder and for thereafter bringing all the charcoal in the container to a glowing condition suitable for immediate use in a charcoal grill or the like.

A further object is to provide a fan driven by a motor or the like to produce circulating air, and a separator between the fan and the charcoal container so that glowing coals do not drop onto the ground or onto the fan and motor, the separator having air passages arranged so that there is efficient introduction of air from the fan to the charcoal for igniting and burning the same.

With these and other objects in view, our invention consists in the construction, arrangement and combination of the various parts of our charcoal starter, whereby the objects above contemplated are attained, as hereinafter more fully set forth, pointed out in our claims and illustrated in detail on the accompanying drawing, wherein:

FIG. 1 is a plan view of our charcoal starter;

FIG. 2 is an elevation thereof with portions of the device broken away and other portions shown in section to illustrate details of construction, and FIG. 3 is a horizontal sectional view on the line 3—3 of FIG. 2.

On the accompanying drawing we have used the reference numeral 10 to indicate a vertical cylindrical wall which has downwardly projecting feet 12 that provide air entrance spaces 13 as shown in FIG. 2. Within the wall 10 which is preferably a cone-shaped cylinder, a horizontal bottom wall 14 is provided and the two walls constitute a charcoal container. The wall 14 is secured in position by ears 18 and rivets or spot welds 32, and has openings 16 whereby this wall acts as a grate for the charcoal which is placed within the wall 10 and on the bottom 14 after burning tinder has been similarly placed.

A handle 19 is provided for convenience in transporting our charcoal starter from a point of charcoal ignition to a barbecue grill or the like, and for tilting the starter so that the glowing charcoal can be dumped into the grill. The upper end of the cylinder 10 is cut off at an angle as shown in FIG. 2 to facilitate pouring of the contents therefrom. The handle 18 is supported by a bracket 22 and a spacer 20 with respect to the vertical wall 10, and a polished sheet metal radiation protective shield 24 is also provided to reduce the heat from the wall 10 by reflection of radiant heat and thermal circulation of air between the shield and the charcoal container. Spacers 46 and 48 as shown in FIGS. 1 and 3 are also part of the handle structure and serve as a means to space the radiation shield 24 from the wall 10.

Within the cylindrical wall 10 a horizontal separator 26 is provided which is of a diameter slightly less than the cylinder 10 at this point to provide air entrance slots 30 as shown in FIG. 3 between four supporting ears 28 that are also riveted or spot welded to the wall 10 as shown at the right side of FIG. 2. The bottom 14 is spaced somewhat above the separator 26 which provides an air space as well as space to receive ashes that might fall from the burning charcoal before it is dumped from the container 10–14. Such ashes can thereafter be shaken out of the charcoal starter while in inverted position, passing out through the grate openings 16. The separator preferably has a depressed central area shown cone-shaped and indicated in FIG. 3 at 27 to cause the ashes to tend to concentrate near the center of the separator rather than fall through the slots 30. The cone-shape also is advantageous in properly directing the air flow from the fan 40.

The means for providing forced air circulation consists of a motor having a field core 34, a field coil 36 and an armature 38 which drives a vertical shaft on which is mounted a fan blade 40. The motor 34–36–38 is supported by a cross bracket 50, the ends of which are supported by the housing 10 or a shroud 42. The shroud 42 extends across the diameter of the cylindrical wall 10 and is provided with a fan opening 44 immediately surrounding the periphery of the fan blade 40. The shroud 42 has a cylindrical wall 43 also riveted or spot welded at 32.

Practical operation

To light charcoal in our charcoal starter, a piece of paper or other tinder is first placed in the charcoal container 10–14 and ignited. The desired amount of charcoal is poured on top of it and then the motor 34–36–38 is energized to create a forced draft which speeds ignition of the charcoal and provides charcoal ready for cooking in about five minutes. The charcoal is then poured into the barbecue grill and cooking proceeds in a normal fashion. If an exceptionally large barbecue grill is involved another charge of charcoal may be prepared in the charcoal starter using a piece or two of already ignited charcoal in the container, in place of paper or tinder. This further reduces the time required to have ignited charcoal ready for adding to the grill.

In FIG. 2 a series of arrows in the right-hand half of the figure show how air enters through the air entrance spaces 13 and flows past the motor and fan, through the opening 44 of the shroud 42 and then around the outer edge of the separator 26 through the slots 30 thereof shown in FIG. 3 and finally returns toward the center of the starter in the space between the separator and the bottom 14 and upwardly through the grate openings 16. The shroud and the separator guide the air, and in passing from the fan to the openings 38 centrifugal force of the air thrown off the ends of the fan blade 40 contribute to efficient circulation of the draft air.

Relatively small current is required for the motor and it may accordingly be powered by dry cell or storage battery, or by 110 volt house lighting current where available.

Some changes may be made in the construction and arrangement of the parts of our charcoal starter without departing from the real spirit and purpose of our invention, and it is our invention to cover by our claims any modified forms of structure or use of mechanical equivalents which may reasonably be included within their scope.

We claim as our invention:

1. In a charcoal starter, a vertically disposed cylindrical wall, air circulating means within said wall for forcing air upwardly therethrough, a bottom wall within said cylindrical wall intermediate the ends thereof and above said air circulating means, said bottom wall and that portion of said cylindrical wall above said bottom wall constituting a charcoal container, a separator spaced between said air circulating means and said bottom wall, said separator having a shallow cone-shaped portion for deflecting air from said air circulating means radially outward, and having means outside the diameter of said air circulating means and adjacent said cylinder wall for admitting air from said air circulating means to the space between said separator and said charcoal container, said bottom wall having air admission openings communicating with said space.

2. A charcoal starter in accordance with claim 1 wherein said means for admitting air from said air circulating means to the space between said separator and said charcoal container comprises the periphery of said separator being of less diameter than the adjacent portion of said cylindrical wall whereby space is provided between said periphery and said cylindrical wall for the flow of air from said air circulating means.

3. A charcoal starter in accordance with claim 1 wherein said air circulating means comprises a fan rotatable on a vertical axis, means for rotating said fan, and a horizontal shroud across said cylindrical wall having an opening immediately surrounding said fan, said shroud spanning the space between said opening and said cylindrical wall.

4. A charcoal starter in accordance with claim 1 having a handle at the side thereof for supporting the same, and a vertical radiant protective shield between the hand-held portion of said handle and said vertically disposed cylindrical wall constituting said charcoal container, said shield being spaced from and substantially parallel to said container.

References Cited by the Examiner
UNITED STATES PATENTS

| 806,885 | 12/05 | Focht | 220—94 X |
| 981,025 | 1/11 | Stapp | 122—59.5 |
| 1,391,125 | 9/21 | Lafond | 220—85 |
| 1,467,815 | 9/23 | Roemer | 126—59.5 |
| 2,058,254 | 10/36 | Pederson. | |
| 2,950,669 | 8/60 | Terry. | |
| 3,060,868 | 10/62 | MacLachlan | 110—1 |

JAMES W. WESTHAVER, *Primary Examiner.*
FREDERICK KETTERER, *Examiner.*